L. W. BARGER.
STEAM PIPE SYSTEM.
APPLICATION FILED JAN. 25, 1917.
1,292,990.
Patented Feb. 4, 1919.
3 SHEETS—SHEET 3.
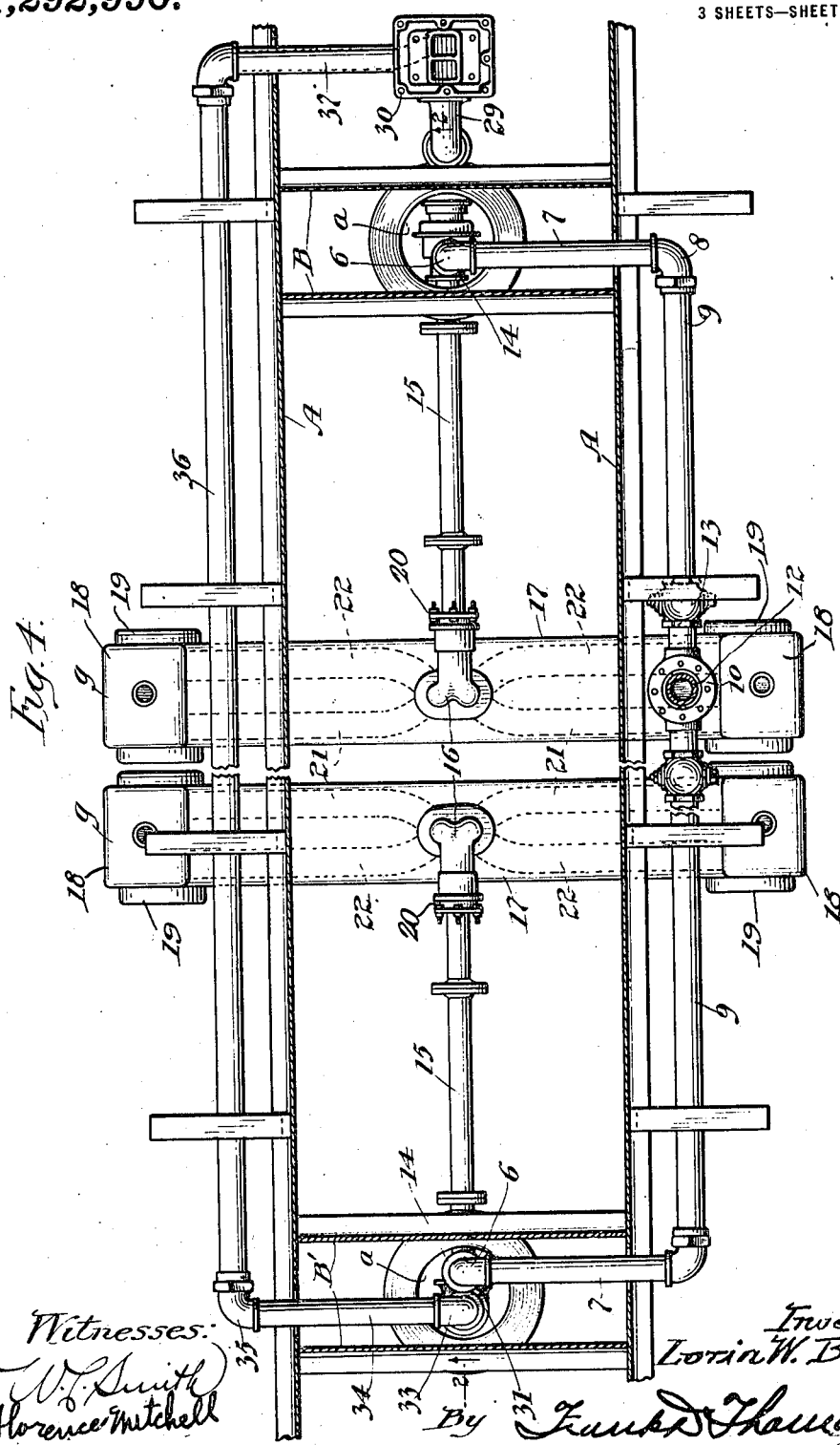

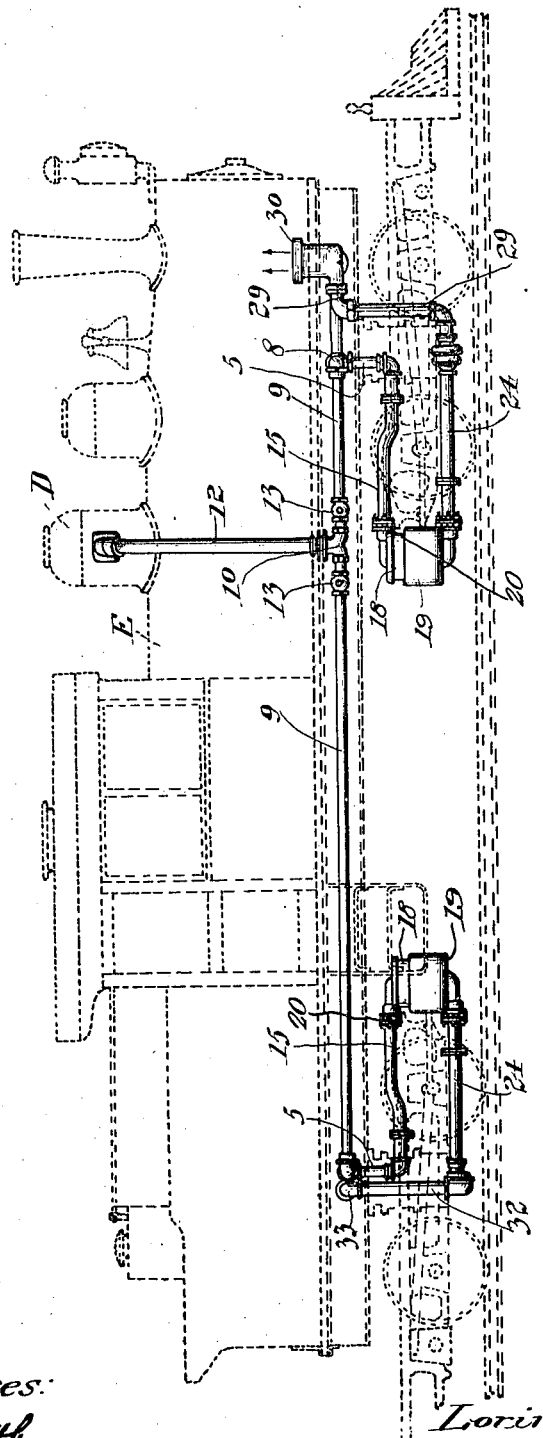

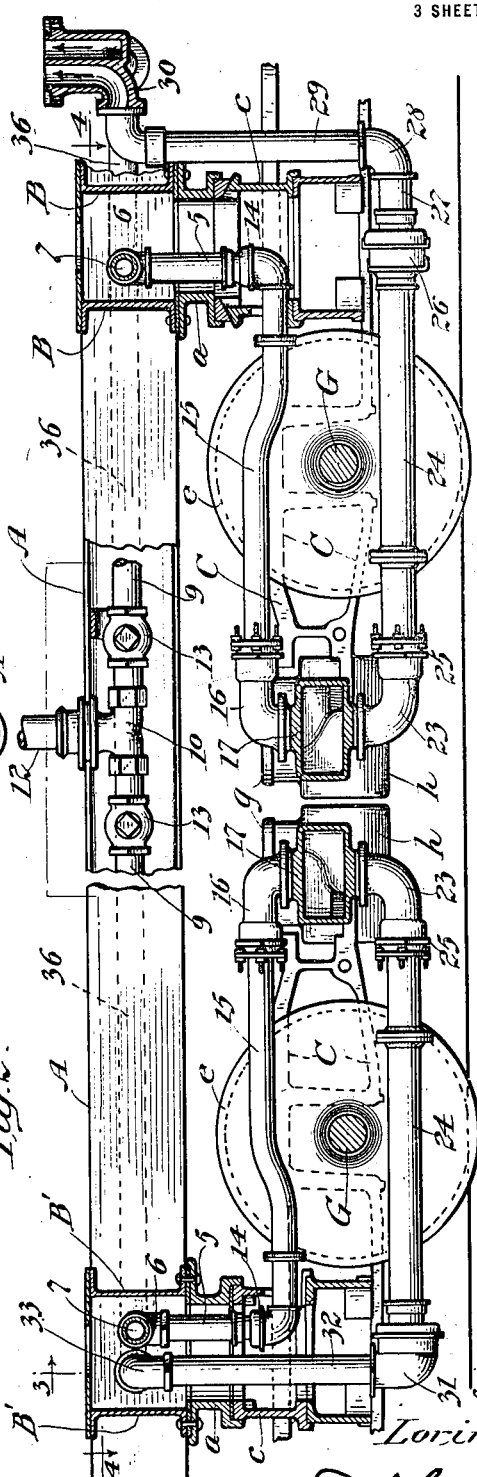

UNITED STATES PATENT OFFICE.

LORIN W. BARGER, OF PHILADELPHIA, PENNSYLVANIA, ASSIGNOR TO DAVENPORT LOCOMOTIVE WORKS, OF DAVENPORT, IOWA, A CORPORATION OF IOWA.

STEAM-PIPE SYSTEM.

1,292,990.

Specification of Letters Patent.   Patented Feb. 4, 1919.

Application filed January 25, 1917.   Serial No. 144,360.

*To all whom it may concern:*

Be it known that I, LORIN W. BARGER, a citizen of the United States, residing at Philadelphia, in the county of Philadelphia and State of Pennsylvania, have invented new and useful Improvements in Steam-Pipe Systems, of which the following is a full, clear, and exact description.

My invention relates to improvements in the pipe system for supplying steam to and exhausting steam from the cylinders of articulated geared locomotives.

The object of my invention is to provide a system of pipes for supplying and exhausting steam to and from the cylinders on the trucks of locomotives which does not subject said pipes to torsional strains, in which a part of the system is rigidly supported by the underframe of the locomotive and a part is flexibly supported by the trucks, in such manner as to accommodate the swiveling or turning of the trucks on their centering devices without affecting the functions of the various pipe elements of the system.

In the drawings:

Figure 1 is a side view of a locomotive in dotted lines showing my improved system applied thereto.

Fig. 2 is a longitudinal central section through portions of the underframe of the locomotive and trucks that support the same, drawn to a larger scale.

Fig. 3 is a transverse section of the same taken on dotted line 3—3, Fig. 2.

Fig. 4 is a horizontal section taken on dotted line 4—4, Fig. 2.

Referring to the drawings, A, A, represent the channel-beam side-sills of the underframe of a locomotive; B, B, parallel transoms connecting the same over the centers of the front and rear trucks; $a, a$, tubular center-castings which are suitably secured to the lower flanges of each pair of said transoms, and $c, c$, tubular center castings which are mounted on the bolster element $d$ of the trucks C, C.

This tubular construction of these centering elements around the axis of which the trucks swivel is very convenient, but is not absolutely necessary, and is adopted to permit of the passage therethrough of a downwardly extending pivotal pipe-section 5 of the steam supply lead of my improved system. The upper end of this pivotal section 5 is connected by an elbow 6 to a transverse pipe-section 7 and the outer end of the latter extends out through, say, the right-hand side-sill and is connected by an elbow 8 to the longitudinally disposed pipe-section 9.

The foregoing description of the construction of the steam pipe lead is confined to the part of my improved system which is supported by the underframe, and is applicable to both the forward and rear trucks. The longitudinal sections 9 of each lead extend longitudinally toward a point intersected by the transverse vertical plane of the dome D of the boiler E where they are suitably connected to the horizontal branches of a suitable T-coupling 10 by means of which they are connected to the lower end of the single vertical trunk 12 of said steam pipe, which is greater in diameter than said pipes 9 and is connected to and leads downward from dome D.

The longitudinal sections 9, 9, are each provided with a suitable valve 13, that is adapted to regulate the steam pressure flowing into the same. These valves are, preferably, located adjacent the coupling 10, but it is apparent they may be located anywhere along the length of said section.

The lower end of each pipe-section 5 is connected by a ball-joint or universal-joint 14 to the contiguous end of longitudinally extending central sections 15, which latter are, preferably, bent upward as they pass over the axle G of the car-wheels $e$ and have their ends farthest from pivotal sections 5 connected by means of slip-joints 20 to elbows 16, the downward turned ends of which latter are connected to the center of length of a transverse bridge 17 connecting the steam-chests 18 of the cylinders 19 on opposite sides of the truck.

The ends of pipe-section 15 that are inserted in the slip-joints have a limited amount of reciprocable play, and when the truck swivels on its axis this reciprocable movement and the ability of its front end to swivel on the axis of pipe-section 5 avoids any displacement of the latter.

The interior of bridge 17 is divided by suitable partitions into several passages, two of which, 21, 21, communicate with elbow 16, as shown in dotted lines in Fig. 4 of the drawings, and lead to and discharge into the steam-chests 18, of cylinders 19, and the other two of which, 22, 22, extend from the discharge-ports of the said cylinders to the center of the bridge where they communicate with and discharge into elbow 23 extending downward therefrom.

Elbows 23, preferably, correspond in construction to elbows 16 and have their lower ends bent in a longitudinal direction and connected to the adjacent ends of the longitudinally extending exhaust-pipes 24 connected thereto by means of slip-joints 25.

The forward end of exhaust-pipe 24 of the forward truck terminates and is connected by a ball-joint 26 to a nipple 27 that connects it to the lower end of an elbow 28 on the lower end of a vertical extension 29 of the exhaust pipe. This vertical extension 29 is located in front of the pivotal members of the forward truck, and its upper end terminates in front of transoms B of the underframe where it is connected by a forwardly bending elbow.

Exhaust-pipe 24 of the rear truck extends rearwardly from bridge 17 and its rear end terminates under the pivot of the truck where it is connected by a ball-joint 31 to the vertical extension 32 of said exhaust-pipe. This extension 32 extends upward through the tubular center casting of the rear truck immediately to the rear of and parallel to the pivotal axis of the same, and its upper end, which terminates between transoms B', B', is connected by a laterally turned elbow 33 to a transverse pipe-section 34. This pipe-section 34 extends in the direction opposite the transverse pipe-section 7 of the steam pipe lead, out through the side-sill of the underframe, and its outer end is connected by a forwardly turned elbow 35 to a comparatively long longitudinally extending exhaust-pipe section 36, which latter at its forward end is connected by a transverse pipe-section 37 to the base 30 of the exhaust-nozzle.

It will be noticed that the sections of pipe of my improved system that are supported by the underframe are immovable while the pipe-sections of the part of the system supported by the trucks are flexible, and will, as the trucks swivel on their axes, automatically accommodate themselves to any change of position thereof with relation to stationary pivotal pipe-sections 5 and the vertical extensions 29 and 32 of the exhaust-pipe without altering their relations or affecting their respective functions of supplying steam to the cylinders and conveying the exhaust steam therefrom.

What I claim as new is:—

1. In a locomotive, the combination with the boiler thereof, and steam pipes immovably connected thereto that lead therefrom to and extend vertically downward alongside the pivotal devices of the truck, of a truck, cylinders carried thereby, flexible reciprocable pipes connecting said immovable pipes to said cylinders that are supported by said truck, and flexible reciprocable exhaust pipes leading therefrom.

2. In a locomotive, the combination with the boiler thereof, and steam pipes immovably connected thereto that lead therefrom to and extend vertically downward alongside the pivotal devices of the truck, of a truck, cylinders carried thereby, a transverse bridge connecting said cylinders, a longitudinally extending reciprocable pipe, a ball-joint connecting one end of the same to the end of the downward extension of said immovable steam pipes and the other end to said bridge, which latter has passages therethrough connecting said reciprocable pipe to the steam-chests of said cylinders, and suitable exhaust pipes for said cylinders.

3. In a locomotive, the combination with the boiler thereof and steam pipes immovably connected thereto that lead therefrom to and extend vertically downward alongside the pivotal devices of the truck, of a truck, cylinders carried thereby, a transverse bridge connecting said cylinders, a longitudinally extending reciprocable pipe, a ball-joint connecting one end of the same to the end of the downward extension of said immovable steam pipe, a slip-joint engaged by and connecting the other end to said bridge which latter has passages therethrough connecting said reciprocable pipe to the steam-chests of said cylinders, and suitable exhaust pipes for said cylinders.

4. In a locomotive, the combination with the boiler thereof, the underframe supporting the same, and stationary valve controlled steam pipes supported thereby that lead from the boiler and extend downward adjacent the truck centering devices, of a truck, cylinders supported thereby, a reciprocable pipe flexibly connected to the said downward extension of the pipe supported by the underframe and connecting the same to the steam-chests of said cylinders, and flexible exhaust pipes leading from said cylinders.

5. In a locomotive, the combination with the boiler thereof, the framework supporting the same, and stationary steam pipes leading from said boiler that are supported by said supporting-frame and extend downward adjacent the truck centering devices, of said truck, cylinders supported thereby, an automatically adjustable pipe leading from the downward extension of said stationary steam pipes to said cylinders, a stationary exhaust pipe extension supported by said boiler supporting frame, and an automatically adjustable pipe connecting said cylinders to the exhaust pipe extension.

6. In a locomotive, the combination with the boiler thereof, the framework supporting the same and stationary steam pipes leading from said boiler that are supported by said supporting-frame and extend downward adjacent the truck centering devices, of said truck, cylinders supported thereby, an automatically adjustable pipe leading from the downward extension of said stationary steam pipes to said cylinders, a stationary exhaust pipe extension supported by said boiler supporting frame, a reciprocable exhaust pipe, and a ball-joint connecting the same to said exhaust pipe extension.

7. In a locomotive, the combination with the boiler thereof, and steam pipes immovably connected thereto that lead therefrom to and extend vertically downward alongside the pivotal devices of the truck, of a truck, cylinders carried thereby, a transverse bridge connecting said cylinders, a longitudinally extending reciprocable pipe, a ball-joint connecting one end of the same to the end of the downward extension of said immovable steam pipes and the other end to said bridge which latter has passages therethrough connecting said reciprocable pipe to the steam-chests of said cylinders, a stationary vertical exhaust-pipe extension supported by said boiler supporting-frame, and an automatically adjustable pipe connecting said bridge to the said exhaust pipe extension.

8. In a locomotive, the combination with the boiler thereof and steam pipes immovably connected thereto that lead therefrom to and extend vertically downward alongside the pivotal devices of the truck, of a truck, cylinders carried thereby, a transverse bridge connecting said cylinders, a longitudinally extending reciprocable pipe, a ball-joint connecting one end of the same to the end of the downward extension of said immovable steam pipes and the other end to said bridge which latter has passages therethrough connecting said reciprocable pipe to the steam-chests of said cylinders, a stationary vertical exhaust-pipe extension supported by said boiler supporting-frame, a reciprocable exhaust pipe, and a ball-joint connecting said bridge to said exhaust pipe extension.

9. In a locomotive, the combination with the boiler thereof and steam pipes immovably connected thereto that lead therefrom to and extend vertically downward alongside the pivotal devices of the truck, of a truck, cylinders carried thereby, a transverse bridge connecting said cylinders, a longitudinally extending reciprocable pipe, a ball joint connecting one end of the same to the end of the downward extension of said immovable steam pipes and the other end to said bridge which latter has passages therethrough connecting said reciprocable pipe to the steam-chests of said cylinders, a stationary vertical exhaust-pipe extension supported by said boiler supporting-frame, an exhaust pipe, a ball-joint connecting the same to said exhaust pipe extension, and a slip-joint connecting the same to said bridge.

10. The combination with the boiler of a locomotive, a supporting-frame therefor, a main steam-pipe leading from the steam chamber of said boiler, branch pipes leading in opposite directions from the lower end thereof, downward extensions connected to the opposite ends of said branch pipes that parallel the pivotal axes of the trucks of the locomotives, and a vertical exhaust-pipe extension; said main pipe, branch pipes and said branch pipe extensions and exhaust pipe extension being immovably secured to said supporting-frame, of forward and rear car trucks, cylinders carried thereby, means carried by said trucks including flexible pipes connecting the said downward extension to said cylinders, and flexible exhaust pipes carried by said truck and connecting said cylinders and said exhaust pipe extension.

11. The combination with the boiler of a locomotive, a supporting-frame therefor, a main steam-pipe leading from the steam-chamber of said boiler, branch pipes leading in opposite directions from the lower end thereof, downward extensions connected to the opposite ends of said branch pipes that parallel the pivotal axes of the trucks of the locomotive, and a vertical exhaust-pipe extension and exhaust nozzle base into which said exhaust-pipe extensions discharge; said main pipe, branch pipes and said branch-pipe extensions and exhaust-pipe extension and exhaust-nozzle base being immovably secured to said supporting-frame, of forward and rear car trucks, cylinders carried thereby, means carried by said trucks including flexible pipes connecting the said downward extension to said cylinders, and flexible exhaust pipes carried by said truck and connecting said cylinders and said exhaust pipe extension.

12. The combination with the boiler of a locomotive, a supporting-frame therefor, a main-steam pipe leading from the steam chamber of said boiler, branch pipes leading in opposite directions from the lower end thereof, downward extensions connected to the opposite ends of said branch pipes that parallel the pivotal axes of the trucks of the locomotives, vertical exhaust pipe extension, and an exhaust-nozzle base; said main-pipe, branch pipes, said downward extension thereof, said exhaust pipe extension and exhaust-nozzle base being immovably secured to said supporting-frame, of forward and rear car trucks, a pair of oppositely disposed cylinders carried by each truck, transverse bridges connecting the steam-chests of each of said pair having steam passages therethrough, reciprocable pipes one end of which is pivotally connected to the lower ends of said downward extensions and communicating with the passages of said bridge, reciprocable exhaust pipes for said cylinders leading from said bridges, and ball-joints connecting the same to said discharge pipe extensions.

In witness whereof I have hereunto set my hand this 27 day of December, 1916.

LORIN W. BARGER.

Witnesses:
JOSEPH C. SINGER,
JOHN N. RICH.